US012187090B2

(12) United States Patent
Hemes et al.

(10) Patent No.: US 12,187,090 B2
(45) Date of Patent: Jan. 7, 2025

(54) ACTIVE SUSPENSION CONTROL ON REPEATING SURFACE UNDULATIONS

(71) Applicant: JAGUAR LAND ROVER LIMITED, Coventry (GB)

(72) Inventors: Elliot Hemes, Solihull (GB); Luke Birch, Mickleton (GB); Dennis Lausecker, Coventry (GB); James Kelly, Coventry (GB); Syed Asad Ali, Coventry (GB)

(73) Assignee: Jaguar Land Rover Limited, Warwickshire (GB)

( * ) Notice: Subject to any disclaimer, the term of this patent is extended or adjusted under 35 U.S.C. 154(b) by 0 days.

(21) Appl. No.: 18/039,235

(22) PCT Filed: Nov. 25, 2021

(86) PCT No.: PCT/EP2021/083064
§ 371 (c)(1),
(2) Date: May 27, 2023

(87) PCT Pub. No.: WO2022/112452
PCT Pub. Date: Jun. 2, 2022

(65) Prior Publication Data
US 2024/0001727 A1    Jan. 4, 2024

(30) Foreign Application Priority Data
Nov. 27, 2020   (GB) ...................................... 2018678

(51) Int. Cl.
*B60G 17/0165*    (2006.01)
(52) U.S. Cl.
CPC .... *B60G 17/0165* (2013.01); *B60G 2400/102* (2013.01); *B60G 2400/204* (2013.01); *B60G 2400/252* (2013.01); *B60G 2400/821* (2013.01)

(58) Field of Classification Search
CPC .......... B60G 17/0165; B60G 2400/102; B60G 2400/204; B60G 2400/252; B60G 2400/821
See application file for complete search history.

(56) References Cited

U.S. PATENT DOCUMENTS 5,539,640 A * 7/1996 Kishimoto ......... B60G 17/0165
701/40
7,168,709 B2 * 1/2007 Niwa .................. B60G 17/0165
701/1
(Continued)

FOREIGN PATENT DOCUMENTS

WO    WO-2021091909 A1 *  5/2021  ......... B60G 17/0165

OTHER PUBLICATIONS

International Search Report and Written Opinion for Application No. PCT/EP2021/083064, dated Apr. 4, 2022, 15 pages.
(Continued)

*Primary Examiner* — Toan C To
(74) *Attorney, Agent, or Firm* — Reising Ethington P.C.

(57) ABSTRACT

A control system (300) configured to control an active suspension system (104) of a vehicle (100), the control system comprising one or more controller (301), wherein the control system is configured to: determine (702) that the vehicle is travelling on or approaching repeating surface undulations; determine (709) vehicle speed; determine (708) an indication of surface wavelength of the repeating surface undulations; and control (722, 728) the active suspension system to control at least one of a leading wheel suspension frequency and a trailing wheel suspension frequency in dependence on the vehicle speed and surface wavelength.

19 Claims, 4 Drawing Sheets

(56) References Cited

U.S. PATENT DOCUMENTS

| | | | |
|---|---|---|---|
| 10,173,489 B2* | 1/2019 | Miska | B60G 17/018 |
| 11,413,922 B2* | 8/2022 | Miska | B60G 17/08 |
| 2004/0094912 A1 | 5/2004 | Niwa | |
| 2008/0243334 A1* | 10/2008 | Bujak | B60G 17/0195 |
| | | | 701/37 |
| 2013/0030680 A1* | 1/2013 | Friedlander | B60W 40/06 |
| | | | 702/56 |
| 2018/0037081 A1 | 2/2018 | Unger et al. | |
| 2019/0126713 A1 | 5/2019 | Miska et al. | |
| 2022/0161624 A1* | 5/2022 | Hirao | B60G 17/019 |

OTHER PUBLICATIONS

Combined Search and Examination Report for Application No. GB2018678.9, dated Aug. 6, 2021, 6 pages.

\* cited by examiner

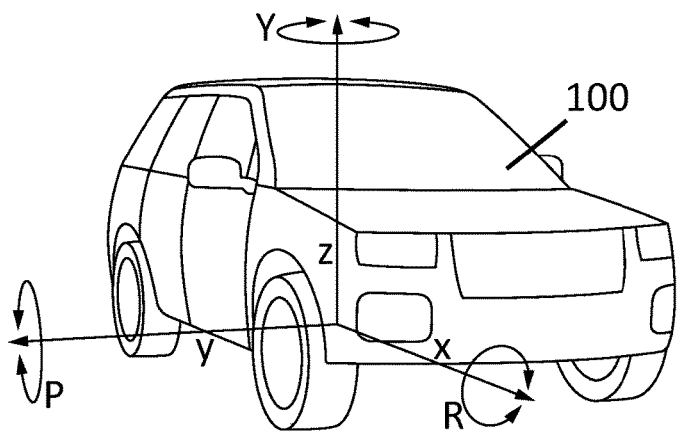
FIG. 1
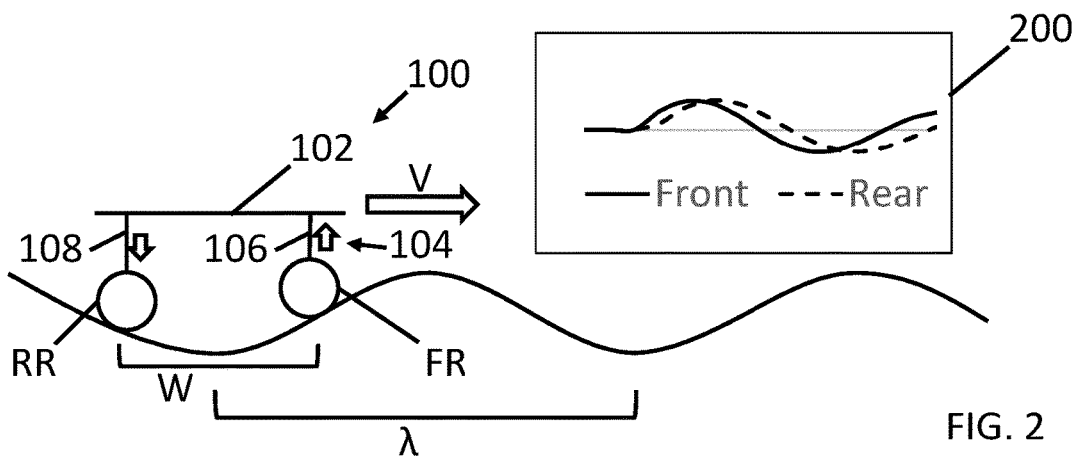
FIG. 2
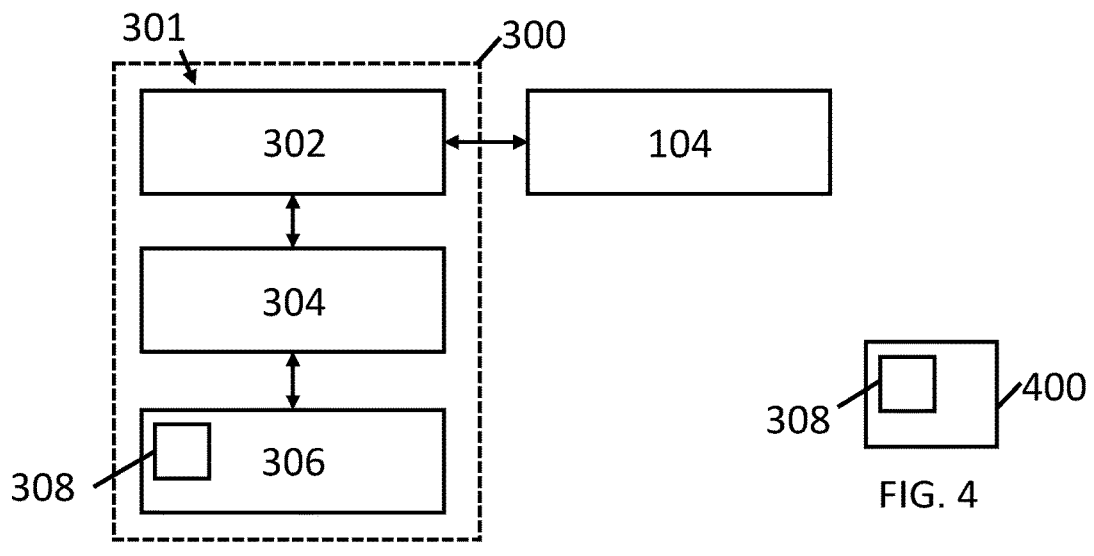
FIG. 3
FIG. 4

ACTIVE SUSPENSION CONTROL ON REPEATING SURFACE UNDULATIONS

TECHNICAL FIELD

The present disclosure relates to active suspension control on repeating surface undulations. In particular, but not exclusively it relates to control of an active suspension system of a vehicle in dependence on repeating surface undulations.

BACKGROUND

Roads and vehicle tracks with loose or deformable material can evolve over time to become undulating, due to repeated passage of vehicles. On frequently-travelled roads, these undulations resemble sinusoidal wave patterns. Undulations can occur on other types of road too.

For comfort, drivers will choose a speed that results in minimal vehicle body disturbance. This speed is dependent on the surface wavelength of the undulations and on the natural passive frequency of the vehicle's suspension. If the driver chooses a speed that is too fast or too slow, the vehicle suspension can get into a resonant frequency resulting in excessive vehicle body pitching and/or wheel hop. This causes discomfort for the vehicle occupants and could result in contact between the front end of the vehicle and the next undulation.

The undulations referred to herein are those which have a wavelength longer than a wheelbase of a typical vehicle.

SUMMARY OF THE INVENTION

It is an aim of the present invention to enable a driver to have more choice over what speed they drive over undulating roads whilst maintaining vehicle composure.

According to an aspect of the invention there is provided a control system configured to control an active suspension system of a vehicle, the control system comprising one or more controller, wherein the control system is configured to: determine that the vehicle is travelling on or approaching repeating surface undulations; determine vehicle speed; determine an indication of surface wavelength of the repeating surface undulations; and control the active suspension system to control at least one of a leading wheel suspension frequency and a trailing wheel suspension frequency in dependence on the vehicle speed and surface wavelength.

In some examples, the indication of surface wavelength is dependent on information from at least one of the following sensors: an accelerometer; a set of suspension displacement sensors; a crest detection system; a communication interface configured for vehicle-to-vehicle and/or infrastructure-to-vehicle communication; or a location sensor, wherein the control system is configured to retrieve historic data using location data from the location sensor;

In some examples, the control system is configured to determine a surface frequency, wherein the surface frequency is proportional to vehicle speed divided by surface wavelength, and wherein the control of the active suspension system is based on the surface frequency.

In some examples, the control system is configured to inhibit the control of the active suspension system if the surface frequency falls below a surface frequency-dependent lower threshold.

In some examples, the control system is configured to inhibit the control of the active suspension system if the surface frequency exceeds a surface frequency-dependent upper threshold.

In some examples, the control system is configured to determine a trailing wheel target suspension frequency and/or a leading wheel target suspension frequency in dependence on the surface frequency.

In some examples, the control system is configured to control at least one of the trailing wheel target suspension frequency to be greater than the surface frequency, and the leading wheel target suspension frequency to be less than the surface frequency.

In some examples, the control system is configured to raise the trailing wheel target suspension frequency relative to the surface frequency, wherein an amount by which the trailing wheel target suspension frequency is raised is inversely proportional to vehicle speed.

In some examples, the trailing wheel target suspension frequency comprises a relationship:

$$f_R = f_H + \frac{W}{V}$$

wherein $f_H$ is dependent on $$\frac{V}{\lambda},$$

wherein $\lambda$ is the surface wavelength, and V is vehicle speed; and wherein W is vehicle wheelbase.

In some examples, the control system is configured to lower the leading wheel target suspension frequency relative to the surface frequency, wherein the amount by which the leading wheel target suspension frequency is lowered is inversely proportional to vehicle speed.

In some examples, an amount by which the leading wheel target suspension frequency is lowered is proportional to vehicle wheelbase divided by vehicle speed.

In some examples, the control system is configured to control an extent to which the trailing wheel target suspension frequency is raised, and an extent to which the leading wheel target suspension frequency is lowered, in dependence on a heave centre position target, wherein the heave centre position target controls a longitudinal position of a centre of heave motion of the vehicle.

In some examples, the trailing wheel target suspension frequency comprises a relationship:

$$f_R = f_H + P_H \frac{W}{V}$$

wherein $f_H$ is dependent on $$\frac{V}{\lambda},$$

wherein $\lambda$ is the surface wavelength, and V is vehicle speed; and wherein $P_H$ is the heave centre position target, between 0 and a max value r; wherein W is vehicle wheelbase; and wherein the leading wheel target suspension frequency comprises a relationship:

$$f_F = f_H + (r - P_H)\frac{W}{V}.$$

In some examples, the control system is configured to determine the heave centre position target in dependence on input received from a human-machine interface.

In some examples, the control system is configured to determine a force demand comprising at least one of: a trailing wheel force demand for a trailing wheel suspension actuator of the active suspension system, dependent on the trailing wheel target suspension frequency; and a leading wheel force demand for a leading wheel suspension actuator of the active suspension system, dependent on the leading wheel target suspension frequency.

In some examples, determining the trailing wheel force demand comprises: determining a trailing wheel target wheel rate in dependence on the trailing wheel target suspension frequency; and determining the trailing wheel force demand in dependence on the trailing wheel target wheel rate.

In some examples, determining the leading wheel force demand comprises: determining a leading wheel target wheel rate in dependence on the leading wheel target suspension frequency; and determining the leading wheel force demand in dependence on the leading wheel target wheel rate.

In some examples, determining the force demand comprises determining a relationship between force demand and a sensed displacement of the active suspension system, and wherein the control system is configured to implement the relationship in a spring controller function.

In some examples, determining the force demand comprises determining a relationship between force demand and a sensed velocity of wheel travel of the active suspension system, and wherein the control system is configured to implement the relationship with sensed velocity of wheel travel in a damper controller function.

In some examples, the control system is configured to determine a time window within which an expected bump event occurs, and to implement the relationship with sensed velocity of wheel travel within the time window.

According to an aspect of the invention there is provided an active suspension system comprising the control system.

According to an aspect of the invention there is provided a vehicle comprising the control system or the active suspension system.

According to an aspect of the invention there is provided a method of controlling an active suspension system of a vehicle, the method comprising: determining that the vehicle is travelling on or approaching repeating surface undulations; determining vehicle speed; determining an indication of surface wavelength of the repeating surface undulations; and controlling the active suspension system to control at least one of a leading wheel suspension frequency and a trailing wheel suspension frequency in dependence on the vehicle speed and surface wavelength.

According to an aspect of the invention there is provided computer software that, when executed, is arranged to perform the method. According to a further aspect of the invention there is provided a non-transitory computer readable medium comprising computer readable instructions that, when executed by a processor, cause performance of any one or more of the methods described herein.

The one or more controller may collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to cause performance of the method.

Within the scope of this application it is expressly intended that the various aspects, embodiments, examples and alternatives set out in the preceding paragraphs, in the claims and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 1 illustrates an example of a vehicle;

FIG. 2 illustrates an example of a vehicle on repeating surface undulations;

FIG. 3 illustrates an example of a control system;

FIG. 4 illustrates an example of a non-transitory computer-readable storage medium;

DETAILED DESCRIPTION

Figure 5:
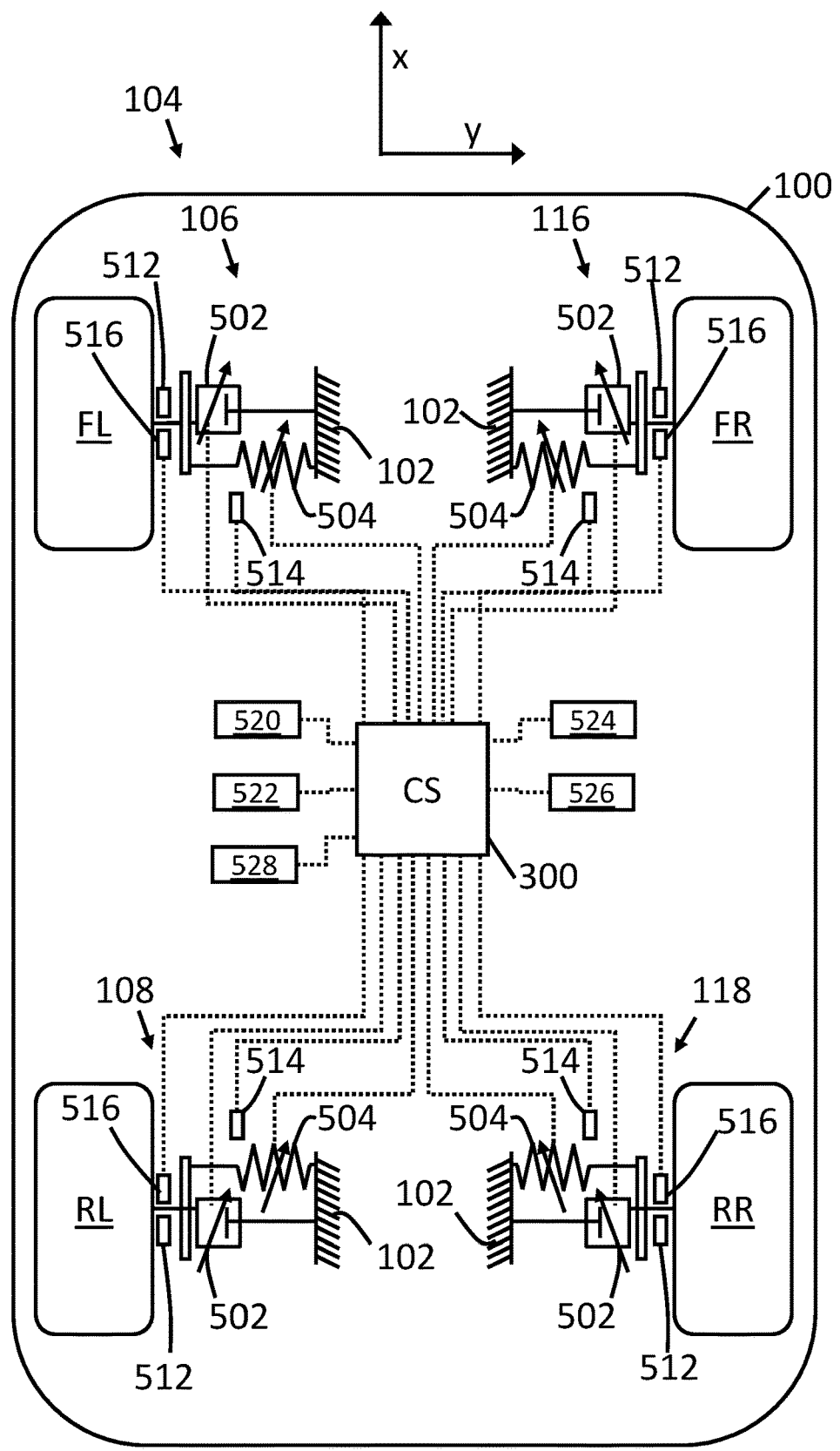
FIG. 5 illustrates an example of an active suspension system of a vehicle.

FIG. 1 illustrates an example of a vehicle 100 in which embodiments of the invention can be implemented. In some, but not necessarily all examples, the vehicle 100 is a passenger vehicle, also referred to as a passenger car or as an automobile. In other examples, embodiments of the invention can be implemented for other applications, such as industrial or commercial vehicles.

FIG. 1 also illustrates a coordinate system. The x-axis is the longitudinal axis. A vehicle body rotation 'R' about the x-axis is roll. The y-axis is the lateral axis. A vehicle body rotation 'P' about the y-axis is pitch. The z-axis is the vertical axis. A vehicle body rotation 'Y' about the z-axis is yaw.

In the examples described herein, the vehicle 100 is assumed to be travelling forward (+x) such that front wheels of the vehicle 100 are leading wheels, and rear wheels are trailing wheels. If the vehicle 100 is travelling in reverse, the rear wheels would be leading wheels and the front wheels would be trailing wheels.

FIG. 2 is a simplified illustration of a vehicle 100 travelling over surface undulations having approximately the same surface wavelength (e.g. peak-to-peak distance) as each other.

FIG. 2 illustrates a vehicle body 102 (sprung mass) of the vehicle 100, a front wheel (e.g. front right FR), a rear wheel (e.g. rear right RR) and a wheelbase W therebetween, and a suspension 104 comprising a front suspension 106 of the front wheel FR and a rear suspension 108 of the rear wheel RR.

As the front wheel FR ascents from a trough to a crest, the change of surface angle compresses the front suspension 106 of the vehicle 100. The front wheel FR displaces (travels) towards the vehicle body 102 as shown by an upwards arrow. The resulting positive peak displacement of the front wheel FR towards the vehicle body 102 from a neutral (zero) position is shown in the embedded graph 200 of FIG. 2 (solid line) in which the y-axis is the amplitude of the displacement and the x-axis is time.

As the front wheel FR crests the undulation, the front wheel FR will then start to rebound. Assuming that the suspension of the vehicle 100 is underdamped, the front suspension 106 will overshoot its neutral position and reach a negative peak displacement at full rebound.

If full rebound occurs very close to the next ascent to the next crest, the next full bump will be more severe and the vehicle body 102 could pitch dramatically. If the vehicle 100 is driven at an improper speed, a resonance is set up causing the pitching to increase over time which could result in body-to-ground impact or wheel hop.

Without embodiments of the present invention, the driver may be forced to drive at a set speed to avoid resonance, which may not be the speed desired by the driver.

The rear wheel RR will closely follow the pattern of the front wheel FR, but slightly lagging by a time equal to wheelbase length W divided by vehicle speed V (see dashed line in embedded graph 200). Notably, if the rear wheel RR reaches full rebound 602 later than the front wheel FR reaches full rebound, this will be felt as a pitch change rather than as heave (linear z-axis motion). Pitch changes are typically perceived as being less comfortable than heave changes for the vehicle occupants.

The front suspension 106 has a natural frequency which not only depends on the stiffness of the front spring, but also depends on the sprung mass onto the front wheel FR. The rear suspension 108 also has an associated frequency which may be higher to reduce the delay of the full rebound of the rear wheel RR. In a passive suspension, the frequencies are factory-predetermined to provide the best ride quality and handling in a typical use case (e.g. one vehicle speed), but not necessarily in all use cases.

In embodiments of the present invention, the suspension is an active suspension system that can be controlled by a control system 300 such as the one shown in FIG. 3. This enables dynamic control of spring force and/or damper force to enable the vehicle 100 to be driven over the undulations at a range of speeds without excessive pitching motions.

The control system 300 of FIG. 3 comprises a controller 301. In other examples, the control system 300 may comprise a plurality of controllers on-board and/or off-board the vehicle 100. In some examples, a control system 300 or a controller 301 may be supplied as part of an active suspension system 104.

The controller 301 of FIG. 3 includes at least one processor 304; and at least one memory device 306 electrically coupled to the electronic processor 304 and having instructions 308 (e.g. a computer program) stored therein, the at least one memory device 306 and the instructions 308 configured to, with the at least one processor 304, cause any one or more of the methods described herein to be performed. The processor 304 may have an interface 302 such as an electrical input/output I/O or electrical input for receiving information and interacting with external components such as the active suspension system 104.

FIG. 4 illustrates a non-transitory computer-readable storage medium 400 comprising the instructions 308 (computer software).

FIG. 5 illustrates an example implementation of the active suspension system 104.

The active suspension system 104 comprises front left active suspension 106 for a front left wheel FL, front right active suspension 116 for a front right wheel FR, rear left active suspension 108 for a rear left wheel RL, and rear right active suspension 118 for a rear right wheel RR. The active suspension for each wheel (e.g. quarter/corner) of the vehicle 100 may be individually controllable.

The active suspension for each corner of the vehicle 100 comprises an actuator 502.

The actuator 502 may be a hydraulic actuator such as a hydraulic fluid-filled chamber containing a piston. One end of the actuator 502 is coupled to a vehicle wheel and the other end is coupled to the vehicle body 102. A second spring element 504 (e.g. coil or pneumatic) may be in equilibrium and acting in parallel with the actuator 502.

When the vehicle suspension is undisturbed, the piston of the hydraulic actuator 502 sits at a particular neutral position in the chamber.

The piston can move in either direction inside the chamber, e.g. due to a road disturbance compressing the actuator 502. The piston can displace fluid out of the chamber into a hydraulic circuit (not shown). The fluid imparts a restoring force against movement of the piston. Energy can be added and/or extracted from the actuator 502 by pumping fluid and/or controlling valves to regulate fluid pressure to either side of the piston.

Therefore, a control system 300 can dynamically control restoring force against the displaced piston by outputting a force demand. This force is equivalent to spring force of a coil spring against displacement. Dynamic control enables the force-displacement relationship to be changed to adapt to a driving scenario. Energy can be added or removed quickly, e.g. within tens of milliseconds.

Dynamic damping characteristics of the actuator 502 can be modified by controlling a fluid valve at a constriction, which regulates the rate at which fluid is transferred in and out of the actuator 502 by movement of the piston. Bump and rebound damping characteristics could be controlled independently in some examples.

Therefore, force demands to the actuator 502 can control spring force and damping. In order to control spring force, the control system 300 may output a force demand that is dependent on sensed wheel travel (wheel-to-body displacement/articulation). In order to control damping characteristics, the control system 300 may output a force demand that is dependent on sensed wheel travel velocity in a wheel travel axis.

The wheel travel may be sensed by a wheel-to-body displacement sensor 514 (suspension displacement sensor), for example. The wheel-to-body displacement sensor 514 is placed somewhere on the active suspension and can sense the position of the wheel along an arc defined by suspension geometry. An example of a wheel-to-body displacement sensor 514 is a rotary potentiometer attached to a lever, wherein one end of the lever is coupled to the vehicle body 102, and the other end is coupled to a suspension link.

Wheel travel velocity can be indicated by the time-rate-of-change of wheel position. Wheel travel velocity can be sensed by integration of wheel acceleration from a wheel hub accelerometer 516 and/or by differentiation of wheel travel. A hub accelerometer 516 can be provided for each wheel, and coupled to the unsprung mass of the vehicle 100. Like the wheel-to-body displacement sensor 514, a hub accelerometer 516 can also be regarded as a suspension displacement-based sensor because hub acceleration in the z-axis is dependent on a rate of change of suspension displacement.

In some examples, the control system 300 more accurately determines the wheel travel and/or its associated derivatives by fusing information from the wheel-to-body displacement sensor 514 with information from hub accelerometers 516.

The above example refers to a hydraulic actuator 502, and in other embodiments the actuator may be an electromagnetic actuator or a pneumatic actuator, or the like.

In FIG. 5, the active suspension further comprises a second spring element 504 such as a pneumatic spring, enabling control of ride height. The control system 300 may be configured to pump gas (e.g. air) in or out of the pneumatic spring 504 to control ride height. An air-levelling function of the control system 300 seeks to maintain a set ride height irrespective of vehicle load and achieves this by modifying the volume of air and therefore air pressure to maintain the set ride height.

Additionally or alternatively, the second spring element 504 comprises a passive spring (e.g. coil) or is omitted entirely. For example, the actuator 502 can control transient and long-term ride height at the cost of increased energy consumption.

In some examples, the force demand that is transmitted to the active suspension or a low-level controller thereof is an arbitrated force demand based on requests from various requestors and information from various sensors.

FIG. 5 illustrates additional optional features that may interact with the control system 300 to influence force demand calculation. These include any one or more of:

A wheel speed sensor 512 for each wheel. In an example implementation, the wheel speed sensor 512 is part of an antilock braking system (ABS).

A human-machine interface (HMI) 520. This refers to any of the various input devices and input/output devices available to the driver such as touchscreens, displays, hardware switches/sliders/selectors or the like.

At least one accelerometer 522 coupled to the vehicle body 102 (sprung mass). A particular example includes a 3DOF or 6DOF inertial measurement unit (IMU). An example is an accelerometer or a multi-axis set of accelerometers.

A location sensor 524 such as a global positioning system (GPS) sensor.

A topography detection sensor 526 configured to detect a surface topography around the vehicle 100. Examples include imaging sensors. Imaging sensors include cameras, lidar sensors, radar sensors, or the like, or a combination thereof. Cameras, lidar and radar sensors provide an image indicative of topography that can be converted to a 3D point cloud or discretized in some other way, and used for functions such as crest detection. The sensors may be located around the vehicle 100 each having different fields of view. The fields of view include a forward view in the +x-axis. If the methods herein are operable in a reverse gear, the fields of view may include a rear view in the −x-axis.

A wireless communication interface 528 (e.g. radio interface) for vehicle-to-vehicle (V2V) and/or infrastructure-to-vehicle (V2I/I2V) communication. In some examples, the communication interface 528 can enable location-related functions.

Figure 6:
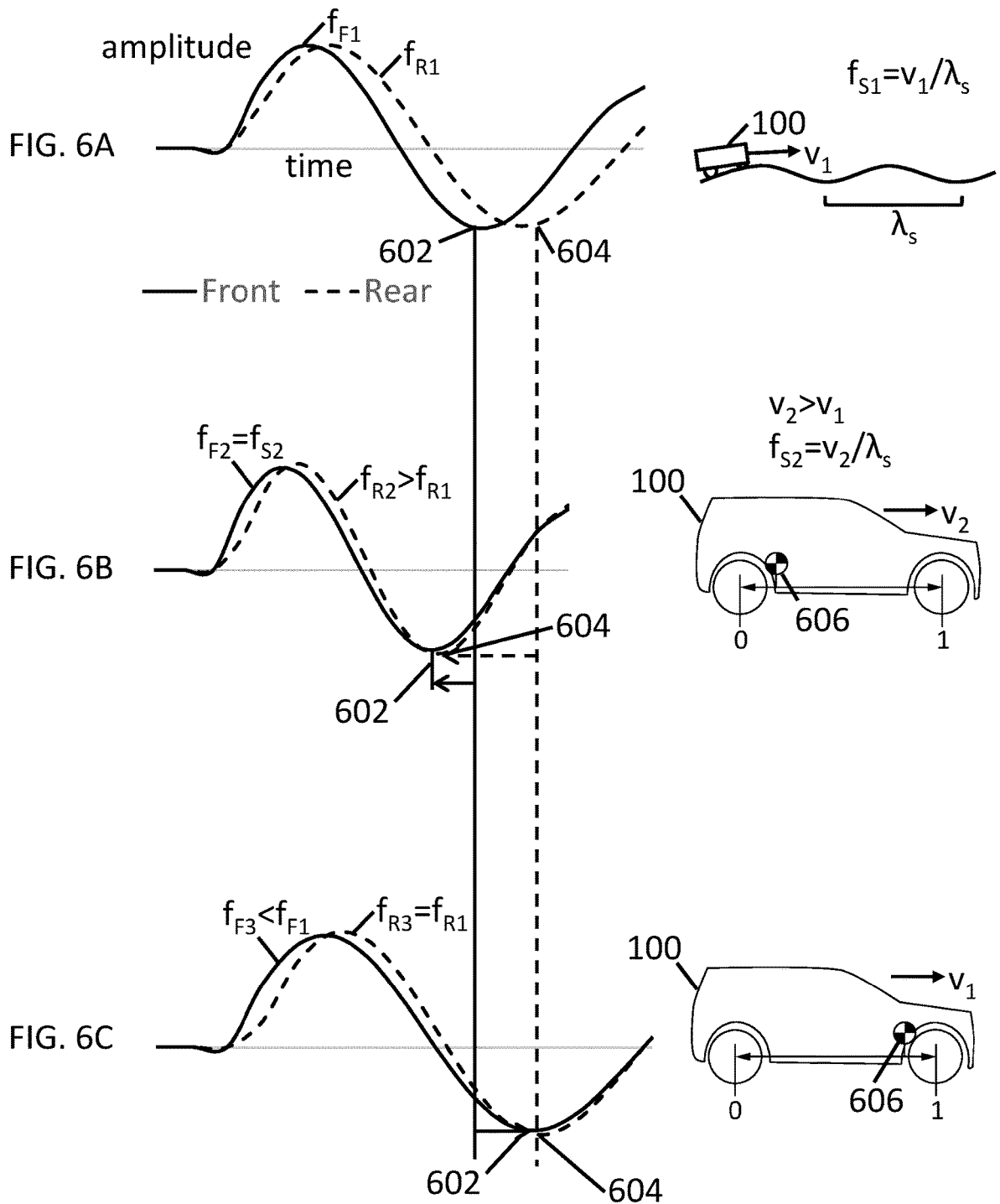
FIGS. 6A, 6B, 6C are displacement-time graphs illustrating conversion of pitch motion to heave motion.

FIGS. 6A-6C are suspension amplitude-time graphs illustrating how the active suspension system 104 can be controlled to reduce vehicle body pitch changes over repeating surface undulations. The amplitude represents wheel-to-body displacement.

FIG. 6A is a reference scenario in which embodiments of the present invention are not employed. An illustrated vehicle 100 is travelling with a speed $V_1$ over surface undulations having a surface wavelength $\lambda_S$. The surface frequency $f_{S1}$ is given by equation (1)

$$f_{S1} = \frac{V_1}{\lambda_S} \quad (1)$$

The front suspension 106, 116 at a front (leading) wheel of the vehicle 100 has a natural frequency $f_{F1}$ that depends on spring rate and sprung mass onto the front wheel FL, FR. To avoid excessive vehicle pitching, the driver may drive at a speed at which $f_{F1}=f_{S1}$.

Even with the driver constrained to a particular speed, the vehicle 100 may encounter pitch changes anyway because full rebound 604 of the rear suspension 108, 118 occurs after full rebound 602 of the front suspension 106, 116. This is because for the given vehicle speed, the natural frequency $f_{R1}$ of the rear suspension 108, 118 may not be high enough for the timing of the two rebounds 602, 604 to coincide.

FIG. 6B is a scenario in which embodiments of the invention are employed. The vehicle 100 is driving at a faster speed $V_2$. As a result, the surface frequency $f_{S2}$ is greater than before. The control system 300 modifies the natural frequency of the front suspension 106, 116 from $f_{F1}$ towards $f_{F2}$, such that $f_{F2}$ matches $f_{S2}$. Therefore, the natural frequency of the front suspension 106, 116 still matches the surface frequency despite the change in vehicle speed.

In FIG. 6B the natural frequency of the rear suspension 108, 118 has also been raised to $f_{R2}$ greater than its previous value $f_{R1}$, in conjunction with the rise in natural frequency of the front suspension 106, 116.

If the vehicle 100 is instead travelling slower, at least one of the suspension frequencies may be lowered instead, towards a lower surface frequency.

Optionally and as shown in FIG. 6B, the natural frequency of the rear suspension 108, 118 has been further raised to at least partially align the full rebound 604 of the rear suspension 108, 118 with the full rebound 602 of the front suspension 106, 116. In this example, $f_{F2}=f_{S2}$ and $f_{R2}>f_{S2}$ & $f_{F2}$. In other words, the rear wheel target suspension frequency $f_{R2}$ is greater than the surface frequency $f_{S2}$ and greater than the front wheel target suspension frequency $f_{F2}$. This further reduces pitch motion by converting it to heave motion. The position of the centre of heave motion is illustrated by a target 606 in the vehicle schematic shown to the right of the graph, showing that rear seats receive the best passenger comfort.

In the example of FIG. 6C, vehicle 100 is travelling at the original speed vi as per FIG. 6A. FIG. 6C demonstrates how the natural frequencies of the front and rear suspension 106, 116, 108, 118 could be changed by different extents, to change the position of the centre of heave motion within the vehicle wheelbase. The natural frequency $f_{F3}$ of the front suspension 106, 116 is reduced compared to $f_{F1}$ whereas the natural frequency of the rear suspension $f_{R3}$ is the same as $f_{R1}$. The front wheel target suspension frequency $f_{F3}$ is less than the surface frequency $f_{S1}$. As a result of the changes of FIG. 6C, the centre of heave motion 606 is further forward in the vehicle 100 as shown by the target 606, to coincide with front seats for front passenger comfort.

Therefore, the natural frequencies can be changed in dependence on surface frequency to reduce pitch changes, and/or the longitudinal position of the centre of heave motion can be controlled.

Therefore, based on FIGS. 6B and 6C, there is provided a method comprising:
- determining that the vehicle 100 is travelling on or approaching repeating surface undulations;
- determining vehicle speed;
- determining an indication of surface wavelength of the repeating surface undulations; and
- controlling the active suspension system 104 to control at least one of a leading wheel suspension frequency and a trailing wheel suspension frequency in dependence on the vehicle speed and surface wavelength.

Figure 7:
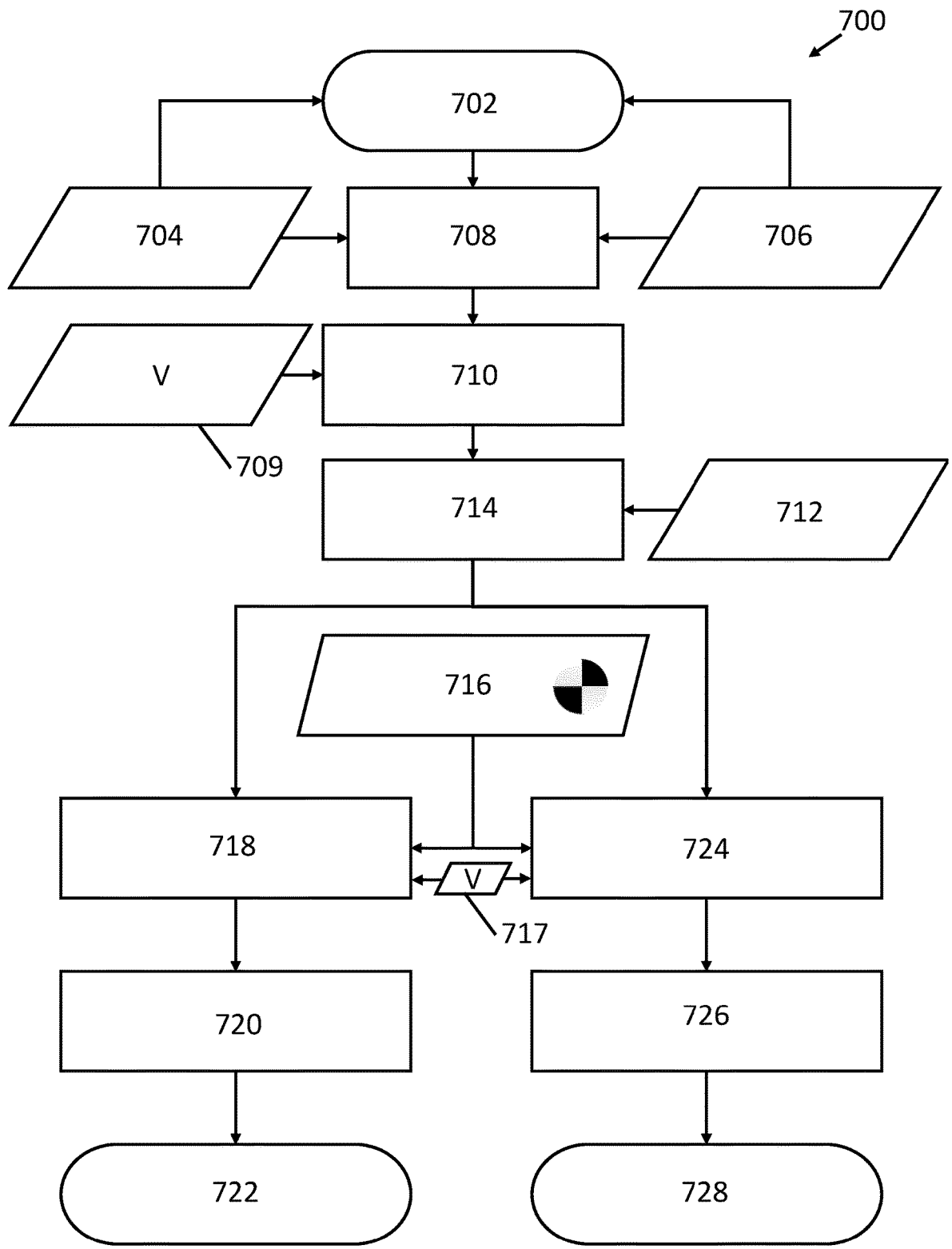
FIG. 7 illustrates an example of a method.

FIG. 7 is a flowchart setting out an example implementation method 700.

At operation 702, the method 700 comprises determining that the vehicle 100 is travelling on or approaching repeating surface undulations, based on satisfaction of an entry condition. In other words, the repeating longwave sinusoidal surface has been directly or indirectly sensed.

Various sources of information alone or in combination can help to make this determination.

A first source of information is reactive information indicative of changing wheel travel and/or vehicle body motion. The reactive information can be received from one or more suspension displacement sensors 514, 516 and/or from a body accelerometer 522. Frequency analysis may reveal that the vertical accelerations have an associated periodicity. The periodicity can be associated to a surface frequency and/or surface wavelength.

The control system 300 can improve its confidence that the reactive information is indicating surface undulations by checking at least one of the following:
- The vehicle 100 is moving over ground;
- The vertical accelerations are not isolated to a particular quarter of the vehicle;
- The trailing axle is following the motions of the leading axle.
- The vertical accelerations are not correlated with unrelated motions like yaw/roll.

Another source of reactive information is from a set of suspension displacement sensors 514, e.g. for each wheel/corner/quarter of the vehicle 100. Similar frequency analysis can be carried out. The control system 300 could check that the rear suspension 108, 118 follows the motion of the front suspension 106, 116.

A crest detection sensor 526 enables at least some preemption, which could optionally be confirmed afterwards by reactive sensing. In an example implementation, a crest detection system uses a 3D point cloud derived from measurements using a topography detection sensor 526, indicating terrain. A crest may be detected as a discontinuity in the point-cloud-based terrain in a predicted/determined path of the vehicle 100. In this example, crests are detected either concurrently (if they are all in a field of view), or consecutively in time. The spatial and/or temporal separation of the crests can be analysed, e.g. using frequency analysis, to detect surface frequency and/or surface wavelength and satisfy operation 702.

A discontinuity-based crest detection algorithm may detect a discontinuity as a boundary between terrain and a region in which terrain would be expected to be present (due to being within a sensing range of a topography detection sensor 526) but is absent, for example due to shadowing of terrain by a crest.

The crest detection system may also determine whether slope information before the discontinuity indicates that a value of slope of terrain before the discontinuity over a predetermined distance exceeds a predetermined threshold in an upwardly-inclined direction (+z).

Detection of a crest may therefore require both detection of a discontinuity and of an above-threshold upward slope ahead of the discontinuity. Other means for detecting a crest are useful.

A communication interface 528, e.g. a V2V/V2I/I2V interface could provide the vehicle 100 with information indicating that the vehicle 100 is on or approaching repeating surface undulations.

Location information from a location sensor 524 such as GPS can be used to determine whether the vehicle 100 is on or approaching an area with repeating surface undulations according to historic data. For example, the vehicle 100 may learn over a plurality of journeys that repeating surface undulations are associated with a particular location.

The entry condition for operation 702 may further require that the repeating surface undulations have certain characteristics, examples of which are described below.

One characteristic is that the surface frequency for the given surface wavelength and vehicle speed is not too high. If the surface frequency is high, it may not be possible to raise the suspension frequency enough to have a significant advantageous effect.

Therefore, a surface frequency-dependent upper threshold can be provided in the control system 300. In an example, the surface frequency-dependent upper threshold is configured to be exceeded by a surface frequency from the range approximately 3 Hz to approximately 4 Hz. This threshold is less than a frequency associated with washboard roads. The threshold can be implemented in various ways such as a frequency (Hz) threshold, or could alternatively be implemented as combined vehicle speed and surface wavelength thresholds, or as counting peaks within a time window, etc.

Another characteristic is that the surface frequency is not too low. Low surface frequencies allow the vehicle suspension to settle before the next undulation. Therefore, a surface frequency-dependent lower threshold can be provided in the control system 300. In an example, the surface frequency-dependent lower threshold corresponds to a surface frequency from the range approximately 0.2 Hz to approximately 0.4 Hz, such as 0.25 Hz.

Another characteristic is that multiple undulations occur within a time window T. This prevents false positives for individual widely-spaced speedbumps, hump-back bridges or the like.

Another characteristic is that the undulations are not too shallow, as indicated by sensed amplitude.

Once the entry condition is satisfied, the method 700 determines an indication of the surface wavelength at operation 708. The indication of surface wavelength may be dependent on sensor information from data block 704 and/or historic data from block 706. The information and techniques may be as described above. The surface wavelength may be continually monitored.

In another embodiment operation 708 may be performed before the entry condition of operation 702 is satisfied. Operation 702 could be performed using surface wavelength information determined at operation 708.

In at least some examples, the active suspension system 104 is controlled based on an indication of surface frequency. Therefore, at operation 710, the method 700 determines a surface frequency $f_S$, which is proportional to vehicle speed V (data block 709) divided by surface wavelength $\lambda_S$ from operation 708:

$$f_S = \frac{V}{\lambda_S} \quad (2)$$

The vehicle speed V could be decided by a user, such as the driver, or by a driver assistance system (e.g. cruise control, autonomous mode).

The following operations of the method 700 are configured to control suspension frequencies to convert vehicle body pitch changes into heave changes.

In a typical implementation, the surface frequency will be treated as a target heave frequency $f_H$ (operation 714).

Optionally, operation 714 provides an opportunity for this target heave frequency to be modified or overridden if necessary, by another frequency demand $f_O$ (data block 712). Operation 714 could be implemented as an arbitration function:

$$f_H = f(f_S, f_O) \quad (3)$$

The other frequency demand $f_O$ could be based on a driver selection or based on sensing. This provides more flexibility, although specific examples are outside the scope of this disclosure.

The flowchart then splits into front suspension calculations and rear suspension calculations. The front suspension branch starts with operation 718 that determines a front wheel target suspension frequency $f_F$. The rear suspension branch starts with operation 724 that determines a rear wheel target suspension frequency $f_R$.

The operations 718 and 724 may depend on a data block 716, but first an implementation without data block 716 will be described. In this implementation, the front wheel target suspension frequency $f_F$ will be modified if necessary to equal the target heave frequency $f_H$, which in at least some examples equals the surface frequency $f_S$. The rear wheel target suspension frequency $f_R$ will be modified:

$$f_F = f_H \ \& \ f_R = f_H + \frac{W}{V} \quad (4)$$

Equation 4 shows that the rear wheel target suspension frequency is raised relative to the surface frequency/target heave frequency, by an amount that is proportional to wheelbase and inversely proportional to vehicle speed V (from data block 717). The rear wheel target suspension frequency is raised to align the rear suspension full rebound 604 towards the front suspension full rebound 602. This compensates for the time delay (W/V) of the rear wheel RL, RR behind the front wheel FL, FR, resulting in the conversion of vehicle pitching motion to heave motion. The effect of this approach is visualised in FIG. 6B.

In an alternative implementation visualized in FIG. 6C, instead of raising the rear wheel suspension frequency, the front wheel target suspension frequency is reduced to align the front rebound 602 with the rear rebound 604. The rear (not front) wheel target suspension frequency $f_R$ will equal the target heave frequency $f_H$:

$$f_F = f_H - \frac{W}{V} \ \& \ f_R = f_H \quad (5)$$

The alternative approaches of equations (4) and (5) correspond to different heave centre positions 606 in the vehicle 100 as visualized in FIGS. 6B, 6C. In a further implementation, it is possible to use a heave centre position target $P_H$ from data block 716 to control the relative front and rear wheel target suspension frequencies to configure the longitudinal position 606 of the centre of heave motion of the vehicle 100 within the wheelbase of the vehicle, or beyond the wheelbase of the vehicle to provide comfort to a row of seats/cargo area overhanging the rear wheels. The heave centre position target $P_H$ has a value between a minimum value (e.g. r=0) and a max value r (e.g. r=1). The relationships then become:

$$f_R = f_H + P_H \frac{W}{V} \quad (6)$$

$$f_F = f_H + (1 - P_H) \frac{W}{V} \quad (7)$$

$P_H$ can therefore be modified within the confines of the wheelbase to either give front occupants the most comfort or rear occupants the most comfort. $P_H$ could be configured using an HMI 520, could be configured by a vehicle mode which could also be via an HMI 520, and/or could be configured by occupant sensing. Chauffeur driven vehicles may bias $P_H$ rearwards to benefit rear occupants. If a driver is the sole occupant, a $P_H$ could be biased forwards.

The remaining calculations convert the target frequencies into actuator force demands. In this method 700 but not necessarily all examples, the conversion uses analytic functions based on known geometric parameters of the vehicle's suspension.

For the front suspension 106, 116, operation 720 converts the front wheel target suspension frequency to a front wheel target wheel rate, and operation 722 converts the front wheel target wheel rate to a front wheel suspension force demand.

For the rear suspension 108, 118, operation 726 converts the front wheel target suspension frequency to a front wheel target wheel rate, and operation 728 converts the front wheel target wheel rate to a front wheel suspension force demand.

An example of the conversion is provided below. The front wheel target wheel rate $K_F$ (per corner) is determined based on the relationship:

$$K_F = f_F^2 2\pi^2 M_F \quad (8)$$

where $M_F$ is a front wheel sprung mass estimate (per corner). The sprung mass estimate may be either a fixed value stored in memory, or a variable. If the sprung mass estimate is a variable, its value could be at least partially based on measurement. An example of sprung mass measurement for a given corner comprises measuring steady-state pneumatic pressure/hydraulic pressure in the actuator 502 or second spring element 504.

The wheel rate has a passive component (e.g. due to second spring element 504, bushes, etc.) and an active component. The active component is to be controlled. Therefore, a front wheel target active wheel rate $K_{F(Active)}$ (per corner) may be determined:

$$K_{F(Active@Wheel)} = K_F - K_{F(Base)} \quad (9)$$

where $K_{F(Base)}$ is the instantaneous passive front wheel rate (per corner):

$$K_{F(Base)} = f(K_{F(Base:Map)}, \Delta z_F) \quad (10)$$

where $K_{F(Base:Map)}$ is a front wheel base wheel rate map, and where $\Delta z_F$ is a front wheel-to-body displacement estimate (per corner) to indicate wheel travel, estimated by the sensors 514.

As the wheel rate may be affected by ride height, the front wheel base wheel rate map can comprise a relationship between wheel rate and a ride height-dependent parameter. In an example, the ride height-dependent parameter comprises pressure and/or volume of the second spring element 504.

Once the front wheel target active wheel rate is known, a gain parameter at the actuator 502 ($K_{F(Active@Strut)}$) can be calculated based on the target active wheel rate:

$$K_{F(Active@Strut)} = K_{F(Active@Wheel)} \times MR_{(Strut)} \quad (11)$$

where $MR_{(Strut)}$ is the motion ratio of the active strut (actuator) of the front wheel which is known to the control system 300.

Based on the gain parameter, a required active force contribution at that corner is determined:

$$F_F = K_{F(Active@Strut)} \times \Delta z_F \quad (12)$$

Equation 12 defines the force demand as a map (relationship). That is, the force demand is calculated based on the undulation-dependent gain parameter multiplied by sensed wheel travel (wheel-to-body displacement/articulation). When there is no wheel travel, the active suspension system 104 behaves no differently from normal. When the suspension is compressed by an undulation, the value of the gain parameter will determine the response.

The gain parameter could be regarded as changing the natural frequency of the actuator 502 analogously to changing the stiffness of an equivalent passive spring. The stiffness can also be nonlinear with respect to wheel travel, as the active suspension system 104 is responsive enough to rapidly change the force.

The same equations (8) to (12) can be applied to the rear wheel RL, RR in operations 726 to 728, by converting from the rear wheel target suspension frequency to a rear wheel suspension force demand using information known or measured about the rear suspension 108, 118.

Additionally or alternatively, the gain parameter from equation 11 could be applied to control damping behaviour in a damper controller function:

$$F_F = K_{F(Active@Strut)} \times WTV \quad (13)$$

where WTV is wheel travel velocity.

This will cause the actuator 502 to substantially critically damp the oscillation of the active suspension, responsive to the surface frequency. This can reduce or avoid overshoot during rebound, reducing or eliminating the pitch changes shown in the earlier graphs. As a result, vehicle pitching motion is reduced.

Note that in the case of damper control, energy does not need to be added. The force demand is in the passive quadrant, meaning that the road surface supplies the energy to the damper. Therefore, aspects of the present invention apply to active suspension systems that are semi-active, e.g. active damper systems that cannot add energy to control spring rate.

For damper control, if the force demand is able to individually configure bump and rebound damper rates, the force demand of equation 13 could be applied only to rebound. However, this could introduce secondary ride discomfort such as chop, wheel hop, shake or jitter, depending on what external excitations occur at the time of increased damping. Therefore, the control system 300 may advantageously provide a time window for the force demand to terminate at the start of the next expected bump event (ascent from trough to crest). Therefore, the suspension is supple and comfortable when compressed by the next ascent. As vehicle speed increases and/or surface wavelength decreases, the time window can shorten based on the monitored surface wavelength/frequency.

The time window control means that the front and rear actuators responsible for damping are stiffened at the front and then at the rear in sequence to combat the resonance.

While the method 700 is performed and if ride height is controllable, the second spring element 504 and/or the actuator 502 could be controlled to raise ride height in order to reduce the chance of body-to-ground contact.

After the force demands have been implemented, the method 700 may then loop back to an earlier operation such as determining the surface wavelength (operation 708). By continually looping the method 700 until satisfaction of an exit condition, confidence regarding the calculated surface wavelength/frequency will increase, and in addition a change in the surface wavelength and/or vehicle speed can be compensated for.

An exit condition may be continually monitored. The exit condition may be based on the same variables as the entry conditions, with or without hysteresis. For example, the method 700 may be inhibited (e.g. blended out or cancelled) if the surface frequency-dependent upper threshold is passed and/or if the surface frequency-dependent lower threshold is passed.

An advantage of the methods described herein is that the user, for example, the driver, is free to choose a vehicle speed and equation 2 onwards will compensate for the speed change, providing a good level of comfort and a reduced probability of body-to-ground contact. The methods described herein provide less of a compromise between vehicle speed and comfort when driving over undulations.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controller may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The operations illustrated in FIG. 7 may represent steps in a method and/or sections of code in the computer program 308. The illustration of a particular order to the operations does not necessarily imply that there is a required or preferred order for the operations and the order and arrangement of the operation may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

Whilst endeavoring in the foregoing specification to draw attention to those features of the invention believed to be of particular importance it should be understood that the Applicant reserves the right to claim protection in respect of any patentable feature or combination of features hereinbefore referred to and/or shown in the drawings whether or not particular emphasis has been placed thereon.

The invention claimed is:

1. A control system configured to control an active suspension system of a vehicle, the control system comprising one or more controller, wherein the control system is configured to:
determine that the vehicle is travelling on or approaching repeating surface undulations;
determine vehicle speed;
determine an indication of surface wavelength of the repeating surface undulations;
determine a surface frequency, wherein the surface frequency is proportional to vehicle speed divided by surface wavelength; and
control the active suspension system to control at least one of a leading wheel suspension frequency and a trailing wheel suspension frequency in dependence on the vehicle speed, surface wavelength, and surface frequency.

2. The control system of claim 1, wherein the indication of surface wavelength is dependent on information from at least one of the following sensors:
an accelerometer;
a set of suspension displacement sensors;
a crest detection system;
a communication interface configured for vehicle-to-vehicle and/or infrastructure-to-vehicle communication; or
a location sensor, wherein the control system is configured to retrieve historic data using location data from the location sensor.

3. The control system of claim 1, configured to inhibit the control of the active suspension system if the surface frequency falls below a surface frequency-dependent lower threshold.

4. The control system of claim 3, configured to inhibit the control of the active suspension system if the surface frequency exceeds a surface frequency-dependent upper threshold.

5. The control system of claim 3, configured to determine a trailing wheel target suspension frequency and/or a leading wheel target suspension frequency in dependence on the surface frequency.

6. The control system of claim 5, configured to raise the trailing wheel target suspension frequency relative to the surface frequency, wherein an amount by which the trailing wheel target suspension frequency is raised is inversely proportional to vehicle speed.

7. The control system of claim 6, configured to lower the leading wheel target suspension frequency relative to the surface frequency, wherein the amount by which the leading wheel target suspension frequency is lowered is inversely proportional to vehicle speed.

8. The control system of claim 6, configured to control an extent to which the trailing wheel target suspension frequency is raised, and an extent to which the leading wheel target suspension frequency is lowered, in dependence on a heave centre position target, wherein the heave centre position target controls a longitudinal position of a centre of heave motion of the vehicle, and optionally wherein the trailing wheel target suspension frequency comprises a relationship:

$$f_R = f_H + P_H \frac{W}{V}$$

wherein $f_H$ is dependent on $$\frac{V}{\lambda},$$

wherein $\lambda$ is the surface wavelength, and V is vehicle speed; and
wherein $P_H$ is the heave centre position target, between 0 and a max value r;
wherein W is vehicle wheelbase; and
wherein the leading wheel target suspension frequency comprises a relationship:

$$f_F = f_H + (r - P_H)\frac{W}{V}.$$

9. The control system of claim 8, configured to determine the heave centre position target in dependence on input received from a human-machine interface.

10. The control system of claim 5, configured to determine a force demand comprising at least one of:
a trailing wheel force demand for a trailing wheel suspension actuator of the active suspension system, dependent on the trailing wheel target suspension frequency; and
a leading wheel force demand for a leading wheel suspension actuator of the active suspension system, dependent on the leading wheel target suspension frequency.

11. An active suspension system comprising the control system of claim 1.

12. A vehicle comprising the control system of claim 1.

13. A method of controlling an active suspension system of a vehicle, the method comprising:
- determining that the vehicle is travelling on or approaching repeating surface undulations;
- determining vehicle speed;
- determining an indication of surface wavelength of the repeating surface undulations;
- determining a surface frequency, wherein the surface frequency is proportional to vehicle speed divided by surface wavelength; and
- controlling the active suspension system to control at least one of a leading wheel suspension frequency and a trailing wheel suspension frequency in dependence on the vehicle speed, surface wavelength, and surface frequency.

14. A non-transitory computer readable medium having stored thereon software that, when executed, is arranged to perform the method according to claim 13.

15. The control system of claim 5, configured to control at least one of the trailing wheel target suspension frequency to be greater than the surface frequency, and the leading wheel target suspension frequency to be less than the surface frequency.

16. The control system of claim 6, wherein the trailing wheel target suspension frequency comprises a relationship:

$$f_R = f_H + \frac{W}{V}$$

wherein $f_H$ is dependent on $$\frac{V}{\lambda},$$

wherein $\lambda$ is the surface wavelength, and V is vehicle speed; and
wherein W is vehicle wheelbase.

17. The control system of claim 7, wherein an amount by which the leading wheel target suspension frequency is lowered is proportional to vehicle wheelbase divided by vehicle speed.

18. The control system of claim 10, wherein determining the trailing wheel force demand comprises: determining a trailing wheel target wheel rate in dependence on the trailing wheel target suspension frequency; and determining the trailing wheel force demand in dependence on the trailing wheel target wheel rate.

19. A vehicle comprising the active suspension system of claim 11.

* * * * *